March 31, 1959 F. L. BAUER 2,880,273
METHOD OF AND APPARATUS FOR SECURING THE TRANSMISSION OF TELEGRAPH IMPULSES
Filed July 12, 1954 3 Sheets-Sheet 1

Inventor:
Friedrich L. Bauer
By [signature] Atty.

March 31, 1959 F. L. BAUER 2,880,273

METHOD OF AND APPARATUS FOR SECURING THE TRANSMISSION OF TELEGRAPH IMPULSES

Filed July 12, 1954 3 Sheets-Sheet 2

Inventor:
Friedrich L. Bauer.
By. [signature] Atty.

Inventor:
Friedrich L. Bauer.
By [signature] Atty.

United States Patent Office 2,880,273

Patented Mar. 31, 1959

2,880,273

METHOD OF AND APPARATUS FOR SECURING THE TRANSMISSION OF TELEGRAPH IMPULSES

Friedrich L. Bauer, Munich, Germany, assignor to Siemens & Halske Aktiengesellschaft, Munich and Berlin, Germany, a corporation of Germany Application July 12, 1954, Serial No. 442,833

Claims priority, application Germany July 15, 1953

6 Claims. (Cl. 178—23)

This invention is concerned with a method of and apparatus for securing the transmission of groups of impulses in telegraphic messages.

The object of the invention is to improve the ten-element code error detecting system disclosed in copending application, Ser. No. 387,594, filed October 22, 1953, now Patent No. 2,849,532 dated August 26, 1956, briefly referred to herein as "10-element system." Such system provides for the transmission of the impulse group representing the code of the corresponding symbol and in addition thereto for the transmission of a group of securing impulses. If the impulse group representing the symbol contains an even number of impulses of a certain kind, for example, spacing current impulses, the securing impulse group will consist of an identical repetition of such space current impulses; if there is an odd number of symbol impulses of such certain kind, the securing impulse group will consist of a mirror image repetition thereof, that is, marker impulses will appear as spacing impulses and vice versa.

Upon comparing the code impulse groups with the securing impulse groups at the receiver, it is possible, in the case of singly distorted symbols, to ascertain which code impulse is distorted and also to restore the original polarization of the distorted impulse. In the event of distortion of a symbol impulse and of the corresponding impulse in the securing group, the symbol is with certainty recognized as distorted. The same holds true of the remaining twice distorted symbols. Symbols which have been distorted more than twice are on the other hand only partially recognizable. About 67% of threefold distorted symbols and about 57% of fourfold distorted symbols will be recognizable, so that only a small part of the distorted symbols will lead to the printing of a false symbol. The printing of the symbols that have been recognized as distorted can be prevented or such symbols can be marked, for example, by printing an error indicating impression.

An important advantage of this system resides in the fact that single distortions, which predominate under ordinary trouble conditions, are recognized and corrected so that the correct symbol is printed. This is especially significant if the equipment is provided with an automatic check-back device which causes repetition by the transmitter, of a symbol ascertained as being distorted. The automatic check-back device appreciably reduces the flow of messages, that is, the quantity of messages transmitted in a time unit, with increasing incidence of mutilation or distortion. The automatic correction of singly distorted symbols, which is made possible in the 10-element system, requires operative actuation of the check-back device only in the case of multiple distortion of symbols and the flow of messages is thus appreciably increased.

Another advantage of the 10-element system resides in the fact that singular as well as dual distortions can be seized. Dual distortions are understood to be distortions within one symbol where an impulse of one polarity, for example, a space current impulse, is converted into an impulse of another polarity, that is, into a mark impulse, and where a mark current impulse is in addition converted into a space current impulse, so that the relationship between the space- and mark current impulses is retained in spite of the fact that the symbol has been falsified. In the case of single distortions, only the space- or the mark current impulses, within one symbol, are affected and the relationship between space- and mark current impulses is thereby altered.

An error detecting device for a seven time element code, briefly referred to as "7-element system" has also become known. This system provides in case of single distortion a complete distortion elimination while causing printing of false symbols in the presence of dual distortions. In this known system, the five element code of the international telegraph alphabet is converted into a seven element code which is constructed so that the relationship or ratio of the mark current impulses to the space current impulses equals, for example, 3:4. Any single distortion alters this relationship; and since the accuracy of the relationship between mark- and space current impulses is checked at the receiver, each ascertained deviation indicating the corresponding symbol as being distorted, no false symbol can result from single distortions.

Disturbances with a duration exceeding the length of one current impulse cause multiple distortion of the affected symbol so that error indicating impressions and false signals multiply in the use of the 10-element system, even with small incidence of disturbances. However, it may be assumed with great probability, that such disturbances are due to single distortions. The above noted 7-element system would in such case prevent the printing of false symbols from any of the distorted symbols.

The object of the invention is, in view of the above outlined facts, to provide a distortion elimination or error detecting system which exhibits the advantages of the 10-element system and also the advantages of a discriminating system such, for example, as the 7-element system. The 10-element system operates with a code of ten current impulses and the 7-element system with one of seven impulses or time elements, and a combined use of both systems is therefore impossible because only one code can be present in the transmission channel. The invention therefore proposes to employ in series or in parallel to the error indicating device used in the 10-element system, a discriminating or counting device which determines the number of current elements or impulses of a certain polarity, contained in a symbol, and which respectively frees the received symbol for printing or marks such symbol as distorted, such freeing or marking being effected in accordance with the ascertained number of the current impulse steps, in cooperation with the error indicating device, and if required after correction of single distortions.

In the 10-element system, there is formed for each symbol code impulse group a securing impulse group which also consists of five current impulse elements and which is formed from the symbol impulse groups in such a manner that the symbol impulse group is simply repeated when the number of certain current elements therein, for example, the number of space current elements or impulses is even, while delivering a mirror image repetition of the symbol impulse elements if the number of such current impulses is odd. Based on this law, and depending on the number of the observed current impulses of certain kind, for example, the space current impulses of a symbol group, the symbol impulse- and the securing impulse group combined will contain the following number of space current impulses or elements:

If the code element impulse group contains one space current impulse, the securing group formed therefrom will contain four space current impulses. Since five different code element groups always contain one space current impulse each, there will in each instance result, for the corresponding symbols, and considering the code element and securing group combined, a number of five space current impulses.

If a code element group contains two space current impulses, the securing group formed by the repeating of such group will likewise contain two space current impulses. Accordingly, with a total of ten symbols, the code element and securing impulses combined will each exhibit four space current impulses.

A code element impulse group with three space current impulses is followed by a securing group with two space current impulses, so that with further ten symbols, the code element and securing group together will each contain five space current impulses.

At five of the possible symbols, the code element group will contain four space current impulses and there will follow a securing group likewise containing four space current impulses, thus producing a total of eight space current impulses.

There is further a symbol group containing five space current impulses, followed by a securing group with zero space current impulses, thus producing a total number of five space current impulses. A total number of zero space current impulses is produced from a symbol group with zero space current impulses followed by a securing group with likewise zero space current impulses.

It will be seen from the above considerations that the total number of space current impulses will be four or five in 26 of the 32 possible cases. Only in five cases will it be eight and in one case zero.

Undisturbed as well as singly or dually mutilated symbols will be recognized with certainty in the 10-element system, and it will therefore suffice to limit the endeavors with an auxiliary error detecting or eliminating system, to the control of symbols which are mutilated threefold or more. If transmission of 26 different symbols is sufficient, such symbols are used in which the total space current impulse amounts to four or five. It will then be necessary to ascertain only the number of space current impulses of each symbol, and if such number is four or five, there will be certainty that the corresponding symbol is distorted or mutilated at the most once. Since a single distortion is controlled with certainty in the 10-element system, and since the distorted impulse is furthermore corrected, so that a faultless symbol is printed, the auxiliary distortion elimination or error detecting device need not affect the received symbol.

It is possible, however, to go a step farther. The 10-element system also recognizes dually distorted symbols with certainty, and the system according to the invention therefore can be arranged so that dually distorted symbols need not be considered. If the total number of space current impulses is three or six, the distortion can only be a second grade one and, in accordance with what has been said before, and provided that the number of space current impulses amounts to three, four, five or six, no further measures have to be taken for preventing the printing of the received symbol.

If the total number of space current impulses is less than three or more than six, the distortion is with certainty more than dual. Such distortions are only partially recognized by the 10-element system and, in accordance with the invention, the printing of the corresponding symbols must be prevented independent of the findings of the 10-element system or, if the printing is nevertheless effected, the corresponding symbol must be marked as being mutilated or distorted.

The system according to the invention fully retains the advantages of the 10-element system, including especially automatic correction of single distortions. Beyond such advantages, multiple distortions are completely recognized provided that they are single distortions, while multiple dual distortions of tertiary or higher grade are only partially recognized, based on the 10-element system. If it is considered that disturbances of long duration, exceeding the duration of one current element or impulse, manifest themselves practically exclusively as single distortions, it will be realized that the system according to the invention prevents practically completely the printing of false symbols in case of such disturbances.

The invention may also be employed for the transmission of 31 symbols if limitation to 26 symbols is not desired. In accordance with a feature of the invention, if the counting device determines the presence of zero, one, two, seven or nine space current elements or impulses, the corresponding symbol is in any case considered as disturbed. On the other hand, if there are eight space current impulses, the symbol is considered as undisturbed provided that such symbol is with certainty recognized as undisturbed by the 10-element system. But if the symbol cannot be recognized with certainty as undisturbed, by the 10-element system, it will be considered as disturbed. Accordingly, in the case of five symbols especially those of relatively minor importance, an automatic correction of single distortions is not effected, but a practically complete distortion elimination is obtained in the case of single distortion. The advantages of the 10-element system are retained for the remaining 26 symbols, and complete distortion elimination is in addition obtained upon single distortion thereof.

The system and method of the present invention is of particular importance in cases where certain symbols, for example, the numerals 0 to 9 must be transmitted with the greatest possible certainty. The new system can be arranged so that it can be put in operation manually. Automatic switching-in can of course be provided, for example, dependent upon the type of disturbance or frequency thereof. The system may also be provided so as to be always operable.

The invention is not limited to the control of telegraph signals, but may be used in connection with transmitting other types of intelligence.

The invention will now be described with reference to the accompanying diagrammatic drawings in which.

Figure 3:
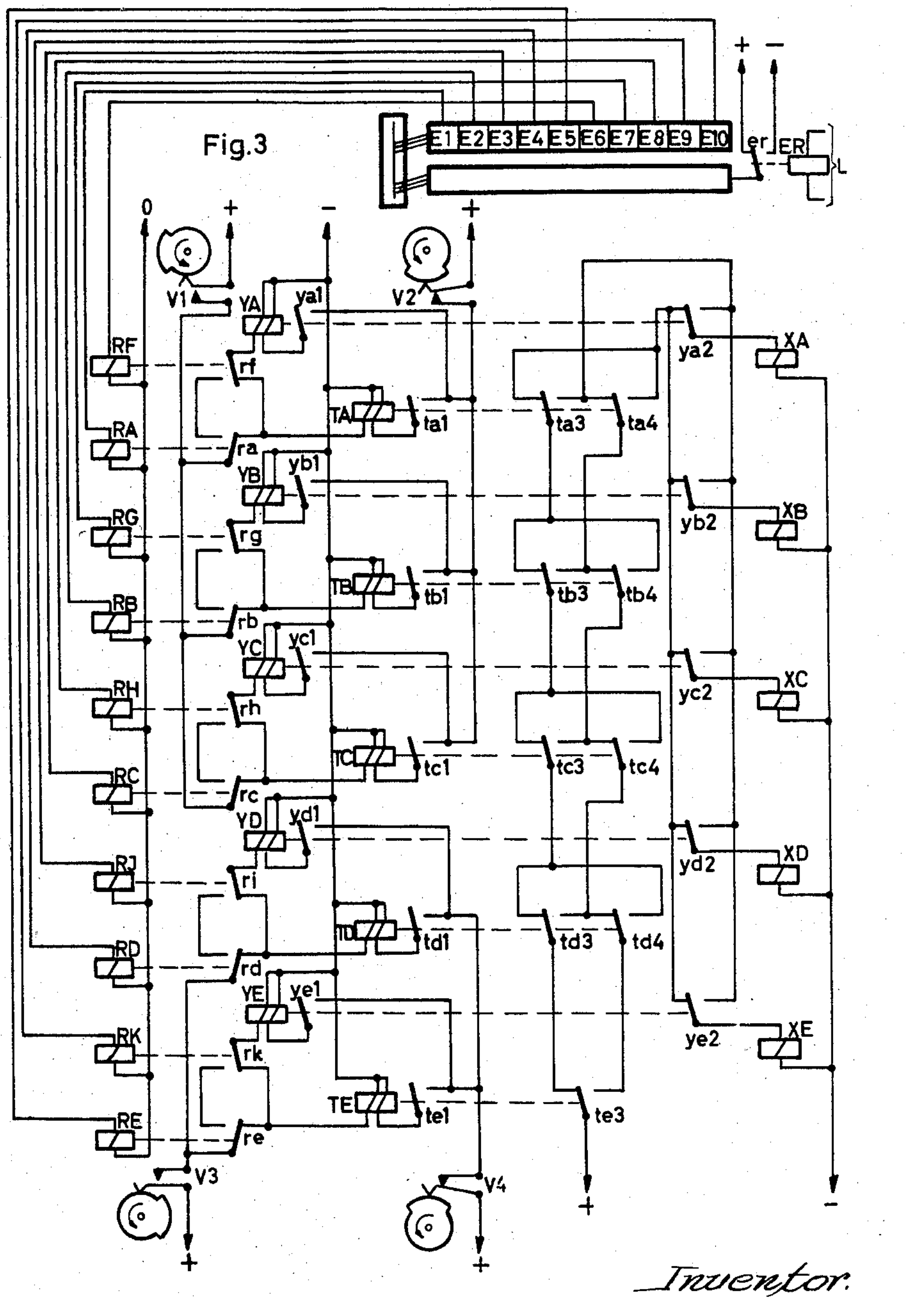

Fig. 3 indicates scanning and storing circuits of the receiver; and

Figure 4:
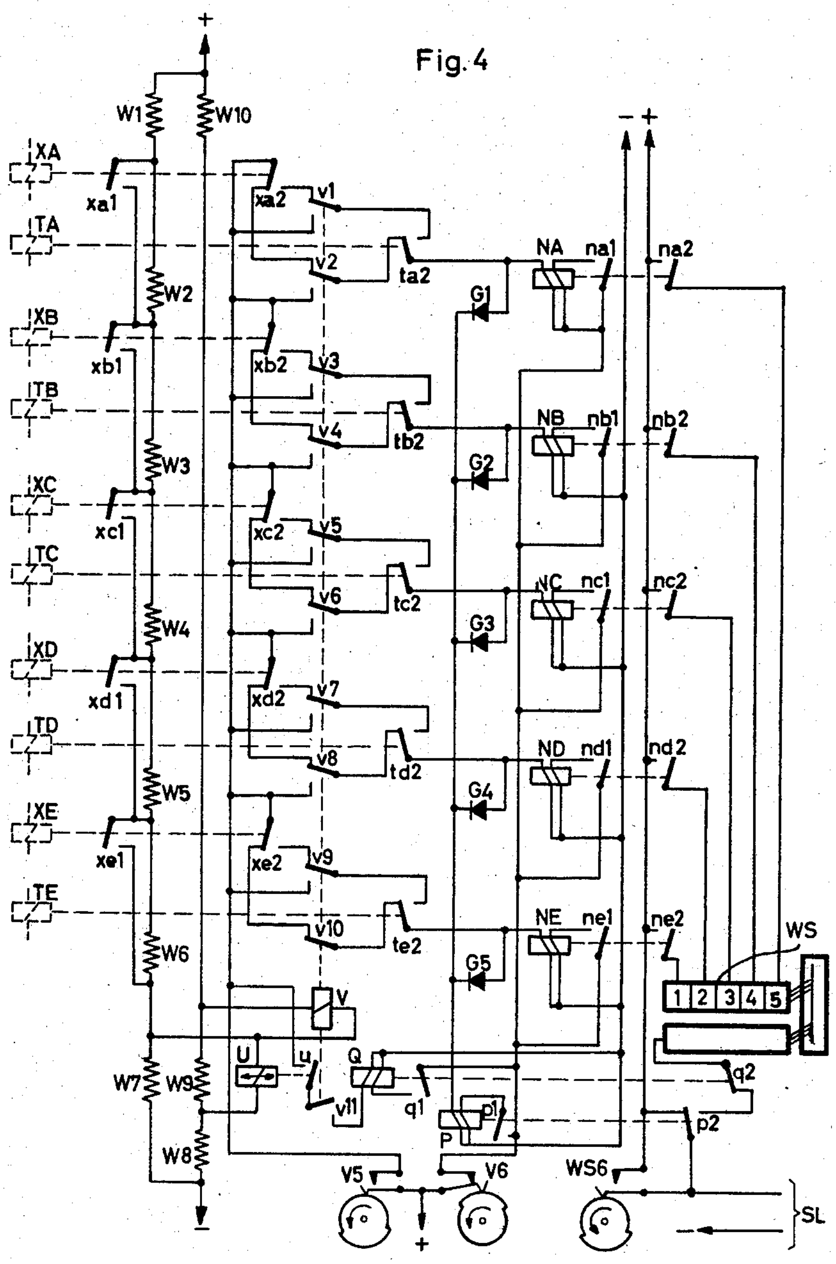

Fig. 4 shows circuit parts of the receiver for a 10-element system, including a bridge circuit, a counting circuit, a correction circuit, and a retransmission circuit.

Figures 1, 2:
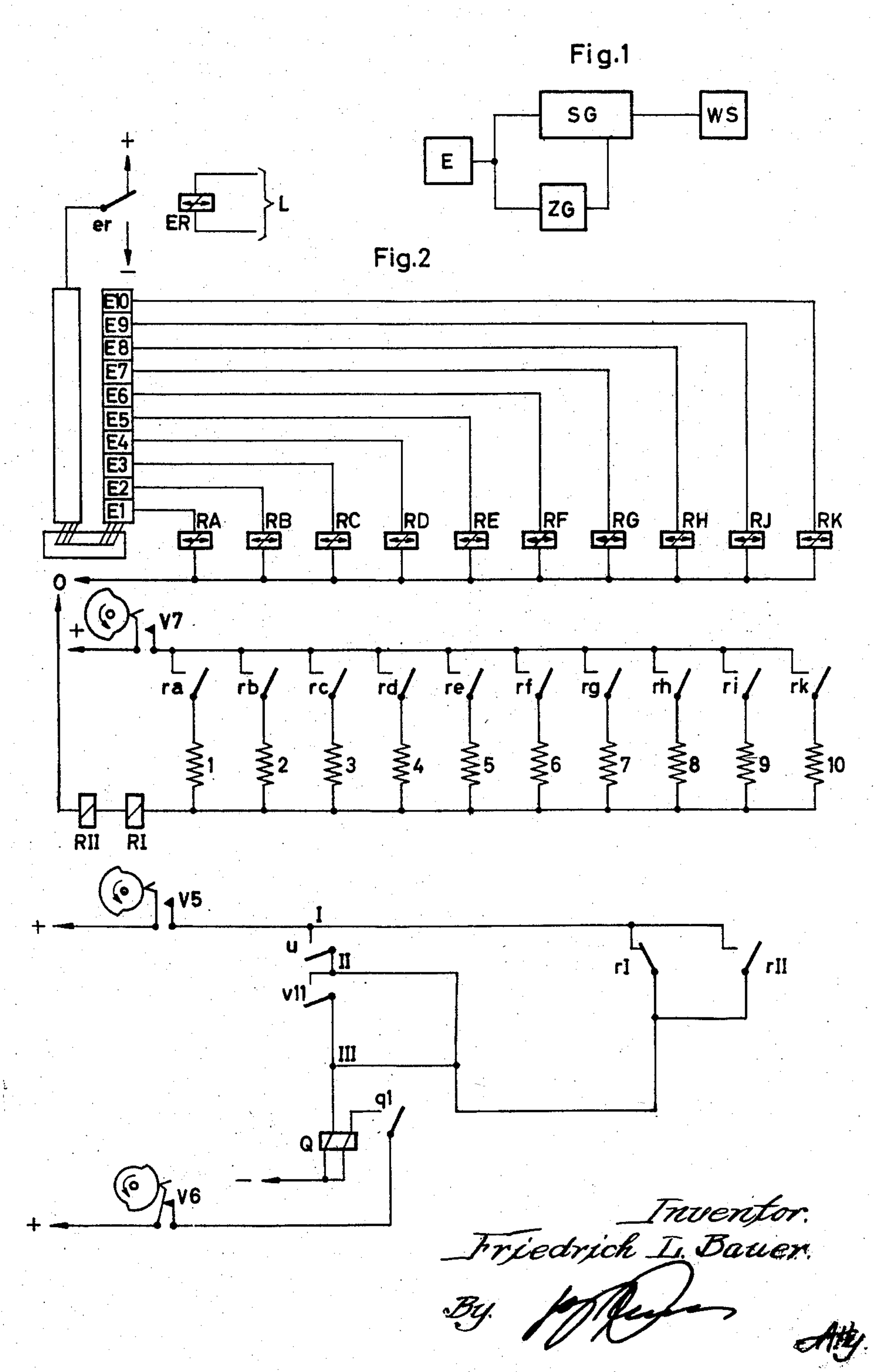
Fig. 1 shows a block diagram of the new system.
Fig. 2 illustrates in its upper part an impulse counting device and in its lower part circuit means for cooperation with receiver apparatus for a 10-element system.

Referring now to Fig. 1, reference character E indicates a receiver for telegraph or teletypewriter symbols; SG indicates the error detecting or indicating device which includes parts as described in detail in the previously mentioned Patent No. 2,849,532; ZG is a counting device; and WS represents a device for retransmitting the signals. The signals are received at E and are transmitted to the error indicating or detecting device SG and also to the counting device ZG. The error indicating device SG controls the retransmitting apparatus WS which may be a teletypewriter or a distributor of a telegraph transmitter.

The impulse counting device shown in Fig. 2 is similar to a counting device included in the prior 7-element system, but, for the purposes of the invention, modified to operate in the 10-element system of Patent No. 2,849,532. The signals delivered by the receiver E of Fig. 1 are received by the receiver relay ER shown in Fig. 2. The relay E responds to the signals and places its contact *er*, depending on the received impulse, on the minus or plus potential of a local current source whose midpoint is grounded. The potential carried at any instant by the contact *er*, is connected to a distributor and is in step with the received signals switched over the segments E1 to E10 to the relays RA to RK. The first current impulse will thus be connected to the relay RA and this relay will energize provided the contact *er* is on plus potential. Upon energizing, RA closes a holding circuit for itself (not shown) and at contact *ra* connects a circuit extending over the resistor 1 and cam controlled contact V7. The second to tenth current impulses affect relays RB to RK in similar manner. The relay RB is energized only if the contact *er* of the receiver relay is ER at the time of connection of relay RB over the selector segment E2 on positive potential. The same is true for the remaining relays RC to RK.

In accordance with the invention, the counting device determines whether or not the 3rd, 4th, 5th or 6th current impulse of the received telegraph signal has a certain polarity. Those of the received code current impulses are to be selected or determined which cause the connection of the contact *er* with the positive potential. The relays which are assigned to these current impulses will then be energized and current will accordingly flow through the resistors which are switched in by the corresponding relays and consequently through the relays RII and RI. The strength of the current flowing through these relays will depend on the number of resistor circuits which are in parallel and lie in series with the relays RII and RI. In order to ascertain whether the contact *er* is on positive potential upon receipt of the 3rd, 4th, 5th or 6th code element impulse, it is merely necessary to dimension the winding of relay RI so that this relay energizes when at least three of the relays RA to RK are energized. The winding of relay RII is so dimensioned that it energizes only at a time when at least seven of the relays RA to RK are energized.

If it is desired to ascertain whether the contact *er* is on positive potential with eight code element impulses, the relay RI will be so dimensioned that it energizes only at a time when at least eight of the relays RA to RK have been energized, and the relay RII is so dimensioned as to energize only at a time when nine or more of the relays RA to RK have been energized.

The device according to Fig. 2 therefore operates similarly as the corresponding device employed in the prior 7-element system except that ten selecting relays are provided instead of seven. The remaining parts included in the prior 7-element system are not necessary for the purposes of the invention. It is, however, also possible to use the device according to the 7-element system and including certain relays thereof by making certain modifications so as to cause a magnet of said system to take over the functions of the relays RII and RI of Fig. 2.

It will be apparent from the foregoing explanations that the error detecting and indicating device of the 10-element system disclosed and described in the previously mentioned Patent No. 2,849,532 (SG in Fig. 1) can be used for the purposes of the present invention practically without any changes and that the prior device of the 7-element system (ZG in Fig. 1) can be used with the modifications as described herein, for cooperation therewith.

The error indicating device of the 10-element is shown in Figs. 3 and 4 (corresponding to Figs. 2 and 3 of Patent No. 2,849,532).

The current pulses of the telegraph signals transmitted over the line L (Fig. 3) are received by the receiver relay $E_T$ in the scanning circuit represented in this figure. The armature contact *er* of the receiver relay will be switched according to the polarity of the incoming current pulses and connects the distributor contacts E1 to E10 to the positive pole of a current source in the case of receiving spacing current pulses, and to the negative pole in the case of receiving marking current pulses. The distributor contacts E1 to E10 are actuated in succession and in synchronism with the transmitter contacts of the transmitter sending the corresponding message and scan the position of contact *er* of the receiver relay ER. Corresponding to the current conditions scanned by the distributor contacts the contacts *ra* to *rk* associated with the polarized distributor relays RA . . . RK will be placed into their spacing or marking positions. The distributor contacts E1 to E5 scan the code group, that is, the characteristic train of current pulses assigned to each telegraph signal, and set their associated relays RA through RE. The control signal that follows will be scanned by the distributor contacts E6 to E10 and their associated relays RF to RK set accordingly.

The setting of the relays RA to RK is spread over the duration of one full rotation of the distributor, but both code groups must be available during a fixed interval for joint evaluation. The settings of the relays RA to RK will therefore be stored for an adequate interval with the aid of the storage register circuit comprising relays YA to YE and TA to TE. The contacts *ra* to *rk* lie, when the relays RA through RK are set by the scanning of spacing current pulses, on the spacing side as shown; in the case of marking current pulses they will be placed into alternate positions.

The contacts *ra* to *re* are connected to positive potential by the cam controlled contacts V1 and V3 which, for reasons of timing reliability, are actuated in rapid succession. With the contacts *ra* to *re* on the spacing side, the positive potential will be extended to the corresponding nonpolarized relays TA to TE, and the latter are consequently energized. The holding contacts *ta*1 to *te*1 hold the relays in operated position. With the contacts *ra* to *re* on the marking side, however, the associated relays remain deenergized. The relays TA to TE hold the received code group stored and, if no disturbance is present, the latter will agree with the original signal.

The nonpolarized relay YA is energized and is held over its holding contact *ya*1 if the contacts *ra* and *rf* are in the same position, that is, if the first current pulse of both the code group and the control signal is of the same type, whereas it will not be energized if tne contacts *ra* and *rf* are in different positions, that is, if the polarity of the first current pulse of the code group is opposite to the polarity of the control signal. The same applies for the relays YB to YE.

In the case of undisturbed signals, the relays YA to YE will all be in the same condition of energization, namely, energized in the case of the code group being transmitted unchanged, that is, when it contains an even number of spacing pulses, and deenergized in the case of a mirrored reproduction of the code group being transmitted, that is, when it contains an uneven number of spacing pulses.

A brief opening of the cam controlled contacts V2 and V4 will open the holding circuits of the energized relays and restore them to their deenergized condition.

The counting circuit of Fig. 3 determines by means of the chain circuit including contacts *te*3, *td*3 and *td*4 to *ta*4 whether the number of spacing pulses of the code group received is even or uneven. If the number is even, the positive potential on contact *te*3 will be extended to the right hand contact points of contacts *ya*2 to *ye*2, and, if the number is uneven, to the corresponding left hand contacts. The contacts *ya*2 to *ye*2 lie, if the relays YA to YE are deenergized, on the side in which they are shown. The nonpolarized relay XA is accordingly energized if the number of spacing pulses is an even one and the relay YA is at rest, or if the number of spacing pulses is an uneven one and the relay YA is energized. The same applies for the relays XB to XE. The nonpolarized relays XA to XE will thus remain deenergized if no disturbance is present, since the above noted conditions for the energization of the relays XA to XE obtain only in the event of a disturbance. Relays XA to XE accordingly operate in the nature of marking relays which ascertain and mark conditions of disturbance.

If a current pulse of the control signal is disturbed, the relay which corresponds to the disturbed pulse—one of the relays XA to XE—will be energized. If, on the other hand, a current pulse of the code group is disturbed, the relay that corresponds to the disturbed pulse—one of the relays XA to XE—will be at normal and the remaining four relays will be energized.

If two current pulses of a code group or its associated control signal are disturbed, then two or three of the relays XA to XE will be energized. If, for instance, the number of spacing pulses of the code group is even, and if two current pulses of the control signal are disturbed, an even number of the relays TA to TE will be energized, and two of the relays YA to YE corresponding to the disturbed pulses will be deenergized. Accordingly, two of the contacts *ya2* to *ye2* will be in normal position as shown and will thus be connected to positive potential as a result of the even number of spacing pulses of the code group, so that two of the relays XA to XE will be energized. For further cases of disturbance the number of relays—among the relays XA to XE—that are energized in any particular case, may easily be established by reference to Fig. 3 and to the foregoing explanations.

If one pulse of the code group and also one pulse of the control signal are disturbed, three relays among the relays XA to XE will be energized if the two disturbed pulses do not occupy the same position within the two groups, that is, the code group and the control signal. If, however, the two disturbed pulses occupy the same position in each group, for example, if the second pulse of the code group as well as of the control signal is disturbed, then all the relays XA to XE will be energized.

It will be apparent from the foregoing that undisturbed signals and signals having only one or two disturbed pulses or elements will of a certainty be detected. With signals having one disturbed pulse only, the disturbed pulse and the nature of the disturbance can be detected, while signals having two disturbed pulses can with certainty be distinguished from undisturbed signals or signals having only one disturbed pulse.

In the case of signals having three disturbed pulses, three or two of the relays XA to XE will be energized insofar as the disturbed pulses occupy different positions within the two groups. If, on the other hand, two of the three disturbed pulses occupy the same position in each group, that is, if the same current pulse is disturbed in both the code group and the control signal, and one of the remaining current pulses of the two groups is disturbed in addition, the setting of the relays XA to XE will be the same as in the case of a signal with one disturbed pulse. Accordingly, this type of disturbance will not be interpreted as a disturbance of three current pulses, but the signal is treated as having one disturbed pulse only and corrected wrongly with a wrong signal ensuing.

Signals having four disturbed pulses will only be interpreted as multiple-disturbed signals if, among the disturbed pulses, only one occupies the same position in both groups, that is, a current pulse of the code group and its corresponding current pulse in the control signal, and, additionally, any two other current pulses having unlike positions within the two groups. In all other cases these disturbances will not be recognized as multiple disturbances and the relays XA to XE will be set as in the case of undisturbed signals or signals having only one disturbed pulse, with the result that wrong signals ensue.

In accordance with the foregoing explanations a distinction must be made between the following cases for the purpose of further evaluation: (*a*) the energization of none or one of the relays XA to XE signifies that the code group is not falsified by disturbances, and that the signal must be printed in agreement with the pulse train of the code group. Any disturbance which affects the associated control signal only will be disregarded, as it is of no consequence to the code group; (*b*) if four of the relays XA to XE are energized, the respective code group must be corrected by reversing the polarity of the disturbed pulse; and (*c*) if two, three or five of the relays XA to XE are energized, this signifies that the signal is multiplely disturbed, that it is beyond correction, and that the signal must be indicated as being disturbed.

A distinction is made between the above cases, *a*, *b*, and *c* with the aid of the bridge circuit included in Fig. 4, comprising resistors W1 to W10 and containing two bridge arms, with the polarized relay U connected to one and the nonpolarized relay V connected to the other arm. The resistors W2 to W6 are connected with contact *xa1* to *xe1* of the relays XA to XE in such a manner that, if one of these relays is energized, the respective contact will shunt one of these resistors.

The bridge circuit, the mode of operation of which is generally known, is so arranged that relay V will not be energized if four of the relays XA to XE are energized, that is, if their contacts shunt the corresponding resistors W2 to W6, but will be energized in all other cases. The polarized relay U switches its contact *u* into the normal position shown in Fig. 4 if none or one of the relays XA to XE is energized, and actuated position opposite to that shown, if between two and five of the relays XA to XE are energized.

In the correction circuit represented in Fig. 4, signals received with one pulse disturbed are corrected, while in the case of signals recognized as being multiplely disturbed the printing of a wrong signal will be prevented and the printing of a "blur" symbol initiated.

In case "*a*," that is, when the code group is not disturbed, the contact *u* will lie in the position as shown. The relay V is energized, so that its contacts *v1* to *v11* are switched to the position opposite to the one shown. The retransmit relays NA to NE will be set, depending on the condition of energization of the relays TA to TE, over the latter's transfer contacts *ta1* to *te1*. If the relays TA to TE are energized, their corresponding contacts will lie in the positions opposite to those shown. The transfer contacts *xa2* to *xe2* exert no influence, being cut off by the contacts *v1*, *v3*, *v5*, *v7* and *v9*. The retransmit relays NA to NE, which, if energized, are held over their holding contacts *na1* to *ne1*, thereby store the code group.

In case "*b*," that is, when one pulse of the code group is disturbed and requires correction, the transfer contact *u* lies in the position opposite to the one shown and, as relay V is not energized, its contacts lie in the position shown. The position of the contacts *ta2* to *te2* will correspond to the condition of energization of the relays TA to TE. The disturbed pulse will be corrected by one of the transfer contacts *xa2* to *xe2* being looped in over the contacts *v1* to *v10*, since the disturbed pulse causes one of the relays XA to XE to display a condition of energization which is at variance with the others. The retransmit relays will in this case store the corrected code group.

In case "*c*," that is, when several pulses of the code group are disturbed, the printing of a wrong signal must be prevented and indicated by the printing of a "blur" symbol. In this case, the contact *u* will lie in the position opposite to the one shown, and relay V will be energized. Over the series circuit of the contact *u* and of the contact *v11*, the disturbance-indicating relay Q will be energized and locked by its holding contact *q1*. The disturbance-indicating relay Q, regardless of the setting of the relays NA to NE, causes transmission of a "blur" symbol, which may, for example, consist of code group 32 of the International Telegraph Alphabet. The receiving teleprinter must, of course, be adapted for printing a "blur" symbol upon receipt of the corresponding code group. To gain time for the retransmission, the positioning of the retransmit relays NA to NE will be effected simultaneously by the closure of the contacts *v5* to *v6*. During non-typing periods, the code group 32 of the International Telegraph Alphabet, that is, five marking pulses, is transmitted over the continuously-synchronized path. Upon reception of this signal, the contacts *ta2* to *te2* will lie on their currentless contact points. The standby-signal relay P remains deenergized. The relay P is connected in parallel with the retransmit relays NA to NE over the rectifiers G1 to G5. The rectifiers are necessary as otherwise the relays NA to NE would be interparalleled through the connection of the relay P. As soon as one of the relays NA to NE is energized, the relay P will also be energized and held over its holding contact *p1*.

If the retransmit relays NA to NE are energized, their contacts *na2* to *ne2* will be switched to the position opposite to the one shown, and will thus apply positive potential over to their associated retransmit contacts WS1 to WS5. Through the successive closure of the retransmit contacts the signal stored in the relays NA to NE will be scanned and, over the relay contacts *q2* and *p2*, transmitted to the transmission line SL leading, for instance, to a teleprinter subscriber. If the relay Q is energized, its contact *q2* will disconnect the retransmit contacts WS1 to WS5 from the transmission line.

The retransmit contact WS6 transmits the stop element of usual length when the signal has been scanned by the retransmit contacts WS1 to WS5.

During non-typing periods the standby-signal relay P is released, and its contact *p2* lies in the position shown to transmit continuous spacing current to the line SL.

As shown in the bottom part of Fig. 2, there are provided terminals I, II and III which may be interconnected with similarly marked terminals leading to contacts *r*I and *r*II of the relays RI and RII shown in Fig. 2.

If it is desired that the error indicating arrangement of the 10-element system should remain unaffected at a time when code element impulses of a certain polarity are contained in the received signals 3, 2, 5 or 6, the contacts *r*I and *r*II of Fig. 4 will be connected at the terminal points I and III. The circuit arrangement according to Fig. 2 will cause energization of relay RI at a time when at least three current impulses of such polarity are present while relay RII will only be energized at a time when seven or more impulses are ascertained. Accordingly, contact *r*I in Fig. 2 will be opened due to the energization of relay RI, and if the relay RII is not energized, contact *r*II will remain open. The contacts *r*I and *r*II which are connected to the terminals I and III in Fig. 3 therefore will not affect the contacts *u* and *v11*. The error indicating device of the corresponding 10-element system will in such case remain unaffected.

However, if less than three or more than six of the corresponding current impulses have been ascertained, either the relay RI is not energized or both RI and RII are energized. In the first case, contact *r*I will remain closed and will shunt the contacts *u* and *v11*, causing energization of relay Q and thereby marking the received symbol as mutilated. If relays RI and RII are energized, contact *r*II will be closed and relay Q will likewise be energized. The counting device thus controls the operation of the error indicating device.

The error indicating device of the 10-element system is as previously stated adapted to ascertain with certainty whether a received signal is not distorted or mutilated. Only in such a case will the contact *u* of Fig. 2 be open. In the presence of any disturbance, even one that can be corrected, the contact *u* will be closed. In accordance with the invention, at a time when the counting device has ascertained eight current impulses of a predetermined polarity, the received signal will be freed for printing only if it has been with certainty recognized as undisturbed by the error indicating device of the 10-element system. In such a case, the contacts *r*I and *r*II, Fig. 2, are connected to the terminals II and III of Fig. 3. The relay RI of Fig. 2 is in such case so dimensioned that it energizes only at a time when eight of the relays R1 to R10 are energized. The relay RI energizes only at a time when more than eight of the relays RA–RK are energized. Accordingly, contact *r*I is only open when relay RI is energized. In such a case, contacts *r*I and *r*II will be open and the circuit Fig. 3 will not be affected. However, if relays RI and RII are energized, contact *r*II will be closed and contact *v11* will be shunted. Contact *u* is in the position in which it is shown in Fig. 2 only if the received signal has been recognized with certainty as being undisturbed and is accordingly closed in any case of distortion of the received signal. Contact *v11* is always shunted in the presence of a number of current impulses other than eight of the predetermined potential and the relay Q is therefore always energized at a time when the received signal is mutilated.

Known and suitable means may be provided for connecting and disconnecting the counting circuit of Fig. 2 (ZG in Fig. 1), if desired automatically, depending on the type and frequency of disturbances and/or depending on the messages that are to be transmitted.

Changes may be made within the scope and spirit of the appended claims.

I claim:

1. In a telegraph system having a receiving station for receiving from a transmitting station signal elements corresponding to code combinations denoting symbols to be printed and also receiving test combination signal elements respectively transmitted directly subsequent to the transmission of the respective code combination elements, said test combination elements, depending upon the number of elements of one polarity of said code combination elements, consisting respectively of identical or mirror repetition of the signal elements of the corresponding code combinations, a device for ascertaining and for signalling transmission errors, said device comprising an error indicating circuit, a counting circuit connected in parallel with said error indicating circuit, circuit means for conducting said code combination signal elements and said test combination signal elements to said error indicating circuit and simultaneously to said counting circuit connected in parallel therewith, a plurality of counting relays in said counting circuit successively operatively responsive to impulses of predetermined polarity corresponding to signal elements received, a plurality of serially disposed control relays, a plurality of resistors disposed in parallel, contact means controlled by said counting relays upon operative actuation thereof for connecting said resistors in circuit with said control relays to cause operative actuation thereof depending upon the operation of counting relays responsive to said impulses of predetermined polarity, a further control relay, and circuit means governed by said first named control relays for governing the actuation of said further control relay for the purpose of respectively releasing signal elements of an undisturbed code combination for the printing of the corresponding symbols or for inhibiting release of signal elements of a code combination recognized as being disturbed depending upon the number of signal elements of said predetermined polarity ascertained by said counting relays.

2. An arrangement and cooperation of parts according to claim 1, wherein said error indicating circuit and said counting circuit and said scanning and transmitting means are adapted for receiving code combinations comprising five signal elements and a test combination respectively allotted thereto and likewise comprising five signal elements.

3. The apparatus defined in claim 1, wherein said error indicating circuit remains unaffected in the event that said counting circuit ascertains three, four, five or six signal element impulses of predetermined polarity, indicating the corresponding symbol as undistorted, to cause said error indicating circuit to free such symbol directly for printing, means in said error indicating circuit for correcting singly distorted symbols and freeing such corrected symbols for printing, means in said error indicating circuit for marking dually distorted symbols as distorted, and means for marking symbols as distorted respective to ascertaining another number of signal element impulses of predetermined polarity.

4. The apparatus defined in claim 3, comprising means in said error indicating circuit for releasing a symbol for printing when said counting device ascertains eight signal element impulses of said predetermined polarity only if the corresponding symbol has been ascertained as undistorted by said error indicating device.

5. The apparatus defined in claim 1, comprising means for respectively connecting said counting circuit with said error indicating circuit and disconnecting it therefrom depending on the frequency of disturbances and type thereof.

6. The apparatus defined in claim 5, comprising means for automatically respectively connecting and disconnecting said counting circuit.

References Cited in the file of this patent

UNITED STATES PATENTS 1,972,326 Angel ---------------- Sept. 4, 1934